United States Patent
Makuni et al.

(10) Patent No.: US 9,063,845 B2
(45) Date of Patent: Jun. 23, 2015

(54) SOLID-STATE DRIVE DEVICE

(71) Applicant: BUFFALO MEMORY CO., LTD., Aichi (JP)

(72) Inventors: Kazuki Makuni, Aichi (JP); Takayuki Okinaga, Aichi (JP); Shuichiro Azuma, Aichi (JP); Yosuke Takata, Aichi (JP); Noriaki Sugahara, Aichi (JP)

(73) Assignee: BUFFALO MEMORY CO., LTD., Aichi (JP)

( * ) Notice: Subject to any disclaimer, the term of this patent is extended or adjusted under 35 U.S.C. 154(b) by 167 days.

(21) Appl. No.: 13/963,501

(22) Filed: Aug. 9, 2013

(65) Prior Publication Data

US 2014/0068157 A1     Mar. 6, 2014

(30) Foreign Application Priority Data

Aug. 29, 2012 (JP) ................. 2012-188415

(51) Int. Cl.
    *G06F 12/02*     (2006.01)
    *G06F 1/30*     (2006.01)

(52) U.S. Cl.
    CPC .............. *G06F 12/0246* (2013.01); *G06F 1/30* (2013.01)

(58) Field of Classification Search
    None
    See application file for complete search history.

(56) References Cited

U.S. PATENT DOCUMENTS

| | | | |
|---|---|---|---|
| 2005/0251617 A1* | 11/2005 | Sinclair et al. | 711/103 |
| 2006/0069870 A1* | 3/2006 | Nicholson et al. | 711/118 |
| 2007/0150654 A1* | 6/2007 | Shin et al. | 711/118 |
| 2008/0104308 A1* | 5/2008 | Mo et al. | 711/103 |
| 2012/0124275 A1* | 5/2012 | Hashimoto | 711/103 |
| 2013/0308433 A1* | 11/2013 | Yulizar et al. | 369/53.41 |
| 2014/0189234 A1* | 7/2014 | Tang et al. | 711/113 |

FOREIGN PATENT DOCUMENTS

| | | |
|---|---|---|
| JP | 05-216775 | 8/1993 |
| JP | 09-311827 | 12/1997 |
| JP | 2004-362426 | 12/2004 |
| JP | 2012-78941 | 4/2012 |
| JP | 2012-108627 | 6/2012 |

* cited by examiner

*Primary Examiner* — Kevin Verbrugge

(74) *Attorney, Agent, or Firm* — Oblon, McClelland, Maier & Neustadt, L.L.P.

(57) ABSTRACT

A solid state drive (SSD) device using a flash memory and including a non-volatile memory that differs in type from the flash memory. The SSD device receives data to be written to the flash memory; stores the received data in the non-volatile memory; stores the data stored in the non-volatile memory to the flash memory; and stores, in the non-volatile memory, flow data indicating a flow of tasks to be undertaken while storing the received data in the non-volatile memory and storing the data stored in the non-volatile memory to the flash memory.

16 Claims, 6 Drawing Sheets

SOLID-STATE DRIVE DEVICE

CROSS REFERENCE TO RELATED APPLICATION

This application is based upon and claims the benefit of priority from Japanese Patent Application No. 2012-188415, filed on Aug. 29, 2012, the entire contents of which is incorporated herein by reference.

FIELD OF THE DISCLOSURE

An aspect of the present technology relates to a solid-state drive device using a flash memory such as NAND flash memory.

RELATED ART

SSD (Solid State Drive) devices have come into use to replace hard disk drives (HDDs) in recent years, for example, from the viewpoint of their high throughput and low power consumption. Among such SSD devices, those using a DRAM (Dynamic Random Access Memory), a volatile memory, as a cache memory for improved read and write speeds are known.

Here, if the supply of power to the SSD device is forcefully interrupted (hereinafter simply referred to as power interruption) due, for example, to an unpredictable blackout, and if the cache memory included in the SSD device is a volatile memory, the data loaded into the cache memory is lost as a result of the power interruption. Therefore, a countermeasure is necessary against loss of data from the cache memory resulting from such a power interruption.

The cache memories used not only in SSD devices but also in other external storage devices are often volatile memories. Therefore, techniques have been proposed, one designed to provide an external storage device with a battery and save the data from the cache memory to a flash memory in the external storage device by using power supplied from the battery in the event of a power interruption (refer to Japanese Patent Laid-Open No. Hei 5-216775, and another designed to drive the cache memory with a battery in the event of a power interruption so as to maintain the data stored in the cache memory (refer to Japanese Patent Laid-Open No. 2012-78941).

Both of the above external storage devices use a battery as a power supply adapted to back up the data from the cache memory with the battery or save the data from the cache memory to a non-volatile memory in the event of a power interruption. Therefore, a battery is necessary for external storage devices in related art as a countermeasure against power interruption. However, if this technique is applied to an SSD device whose advantages are compactness and lightweight, providing a battery inevitably leads to a larger size and heavier weight of the SSD device. It may be possible to use an electric double layer capacitor as a temporary power supply. Even in this case, the SSD device will inevitably have a larger size and heavier weight.

The present technology has been devised in light of the foregoing, and it is an object of the present technology to provide a compact and lightweight SSD device capable of properly dealing with a power interruption.

SUMMARY

According to an exemplary embodiment, the disclosure is directed to a solid state drive (SSD) device using a flash memory and including a non-volatile memory that differs in type from the flash memory. The SSD device receives data to be written to the flash memory; stores the received data in the non-volatile memory; stores the data stored in the non-volatile memory to the flash memory; and stores, in the non-volatile memory, flow data indicating a flow of tasks to be undertaken while storing the received data in the non-volatile memory and storing the data stored in the non-volatile memory to the flash memory.

DESCRIPTION OF THE DISCLOSURE

A description will be given below of an embodiment of the SSD device according to the present technology with reference to the accompanying drawings.

Figure 1:
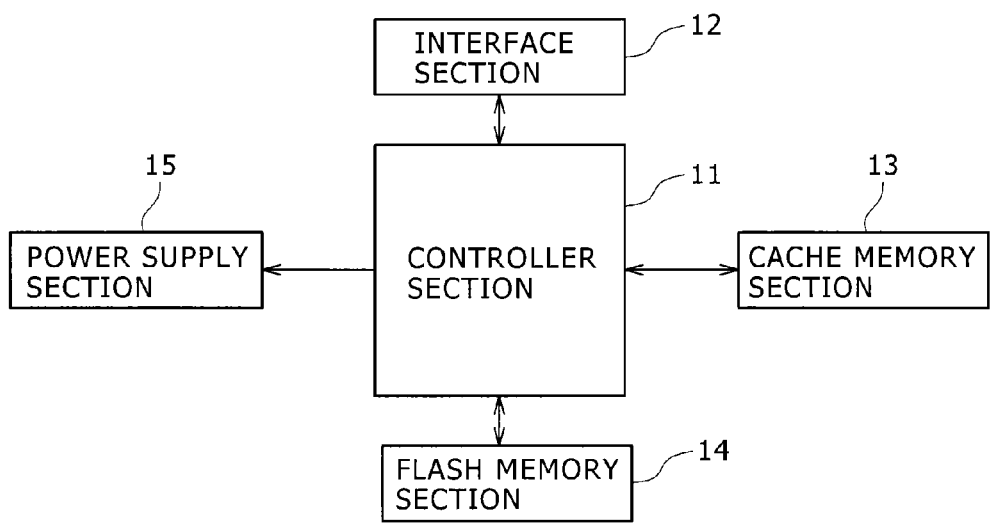
FIG. 1 is a schematic block diagram illustrating a configuration example of an SSD device according to an aspect of the present technology.

An SSD device 1 according to an aspect of the embodiment of the present technology includes a controller section 11, interface section 12, cache memory section 13, flash memory section 14 and power supply section 15 as outlined in FIG. 1. The SSD device 1 is connected to a host (device such as a computer that uses the SSD device) via the interface section 12.

Figure 2:
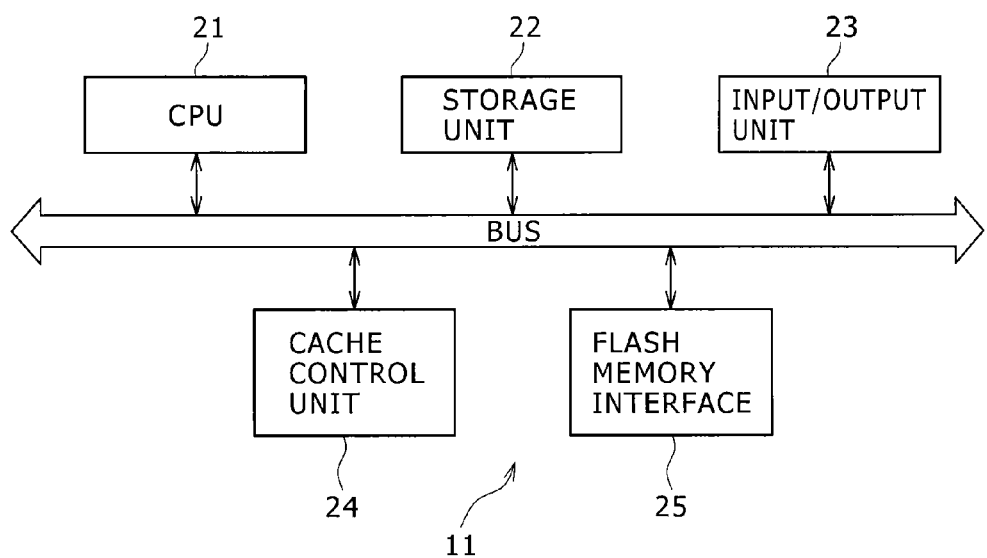
FIG. 2 is a block diagram illustrating an example of components of a controller section of the SSD device according to an aspect of the present technology.

The controller section 11 is a program-controlled device adapted to operate according to the stored program. More specifically, the controller section 11 includes, as illustrated in FIG. 2, a CPU 21, storage unit 22, input/output unit 23, cache control unit 24 and flash memory interface 25.

Here, the CPU 21 operates according to the program stored in the storage unit 22. In the aspect of the present embodiment, the CPU 21 handles data reads and writes to and from the cache memory section 13 and flash memory section 14 in accordance with an instruction supplied from the host via the input/output unit 23. The details of processes performed by the CPU 21 will be specifically described later.

The storage unit 22 of the controller section 11 is a volatile memory such as SRAM (Static Random Access Memory) and holds a program such as firmware executed by the CPU 21. It should be noted that the firmware may be stored in an non-volatile memory not shown such as NOR flash which is connected to the controller section 11 so that the firmware is read from the NOR flash and stored in the storage unit 22. Alternatively, the firmware may be stored in a computer-readable and non-transitory recording media such as DVD-ROM (Digital Versatile Disc Read Only Memory) or supplied from the host and copied to the storage unit 22.

The input/output unit 23 is connected to the interface section 12 and controls communications between the CPU 21 and host equipment via the interface section 12. The input/output unit 23 is, for example, a SATA (Serial Advanced Technology Attachment)-PHY.

The cache control unit 24 handles data reads and writes to and from the cache memory section 13 in accordance with an instruction supplied from the CPU 21. The flash memory interface 25 handles data reads and writes to and from the flash memory section 14 in accordance with an instruction supplied from the CPU 21.

The interface section 12 is a SATA or PATA (Parallel Advanced Technology Attachment) interface connector and connected to the host. The interface section 12 receives a command or data to be written from the host equipment and outputs this data to the controller section 11. Further, the interface section 12 outputs, for example, data supplied from the controller section 11, to the host equipment. Still further, if the input/output unit 23 included in the controller section 11 is a SATA-PHY, and if the interface section 12 is a PATA interface connector, a module may be provided between the controller section 11 and interface section 12 to handle protocol conversion from PATA to SATA or vice versa.

The cache memory section 13 includes a non-volatile memory different in type from a flash memory. FeRAM (Ferroelectric RAM) and MRAM (Magnetoresistive RAM) are among such non-volatile memories. The cache memory section 13 holds data in accordance with an instruction supplied from the controller section 11. Further, the cache memory section 13 reads the held data and outputs it to the controller section 11 in accordance with an instruction supplied from the controller section 11.

The flash memory section 14 includes, for example, a NAND flash memory. The flash memory section 14 holds data in accordance with an instruction supplied from the controller section 11. Further, the flash memory section 14 reads the held data and outputs it to the controller section 11 in accordance with an instruction supplied from the controller section 11.

The power supply section 15 individually turns ON or OFF the supply of power to each of the sections in accordance with an instruction supplied from the controller section 11.

Figure 3A:
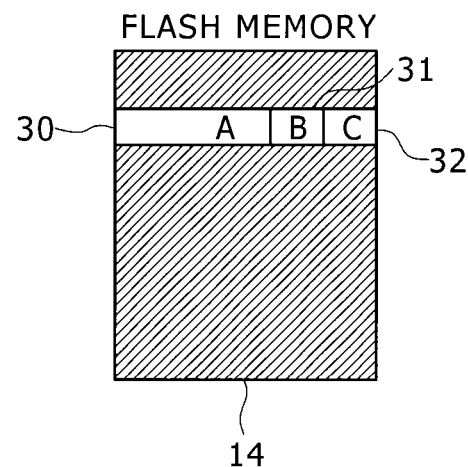
FIG. 3A is a diagram for describing the operation of the SSD device according to an aspect of the present technology.

An outline will be given next of the operation of the SSD device 1 according to an aspect of the embodiment of the present technology with reference to FIGS. 3A and 3B. As illustrated in FIG. 3A, in an ordinary SSD device with no cache memory, data (A) 30 that has been written to the flash memory section 14, a management table (B) 31 adapted to manage the logical addresses of the flash memory section 14, and a task flow data (C) 32 indicating the task flow containing the steps to proceed with data reads and writes to and from the flash memory section 14, are written in the flash memory section 14. The task flow data 32 is written in the flash memory section 14 so that the task flow data 32 can be referenced for recovery following a power interruption of the SSD device. Therefore, it is basically not necessary to store the management table 31 and task flow data 32 in the flash memory section 14 if new data is written to the flash memory section 14.

The management table 31 and task flow data 32 are written in a distributed manner in the flash memory section 14. Therefore, when the flash memory section 14 is filled with the data 30, management table 31 and task flow data 32, it is necessary to delete the unnecessary management table 31 and task flow data 32 (the term "delete" here includes, for example, disabling, at that point in time, the addresses at which the unnecessary management table 31 is stored in the enabled management table 31 to permit data write thereto and block-by-block erasure of the block which includes the portion in question of the flash memory section 14.

The cache memory section 13 is provided to omit such an operation and further to speed up data reads and writes to and from the flash memory section 14. However, if the cache memory section 13 includes a volatile memory such as DRAM, a power supply is necessary as a countermeasure against power interruption as has been described earlier.

Figure 3B:
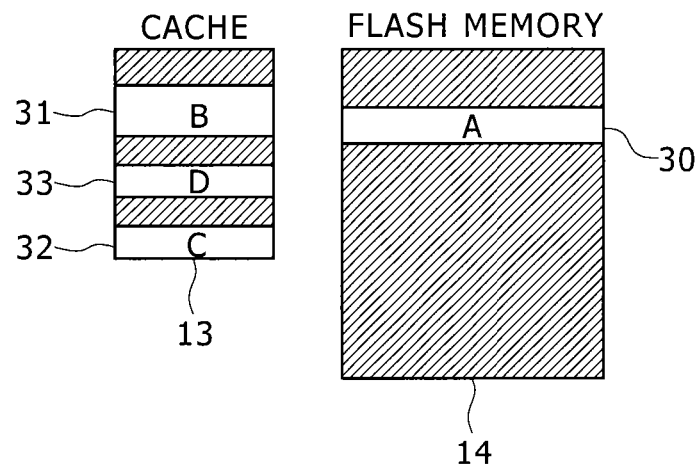
FIG. 3B is a diagram for describing the operation of the SSD device according to an aspect of the present technology.

In the present aspect, therefore, the cache memory section 13 including a non-volatile memory different in type from a flash memory is provided in the SSD device 1 as illustrated in FIG. 3B so that the controller section 11 stores the data (D) 33, management table (B) 31 and task flow data (C) 32, i.e., the pieces of data that have been instructed to be written from the host equipment not shown to the SSD device 1, in the cache memory section 13, and further writes the data 33 to the flash memory section 14. This prevents loss of the data 33, management table 31 and task flow data 32 even in the event of a forceful power interruption in the SSD device 1 thanks to the non-volatile memory of the cache memory section 13 and permits recovery following the power interruption by referencing the task flow data 32.

A detailed description will be given here of the task flow data 32 in the present aspect. Although the specific configuration of the task flow data 32 is arbitrary, the task flow data 32 includes, as an example, a number (1) assigned to the nature of process of each task, source information (2), destination information (3) and task completion flag (4), which are listed in a table. More specifically, the number (1) assigned to the nature of process of each task is a number assigned to each of the processes performed by the SSD device 1. Examples of numbers assigned to the nature of processes are "1" for data transfer from the host equipment to the cache memory section 13, "2" for data transfer from the cache memory section 13 to the host equipment, and "3" for data transfer from the cache memory section 13 to the flash memory section 14. Practically, these numbers are represented as hexadecimal numbers. The source information (2) and destination information (3) are number-by-number source and destination information for the nature of each process. As an example, these pieces of information are address value information of the cache memory section 13. It should be noted that if the source is unique as when the source is the host equipment, or if the source or destination information becomes clear as when block-by-block deletion of the flash memory section 14 is performed, one of the information may be blank. The task completion flag (4) is a flag indicating whether the process in question has been performed.

Figure 5:
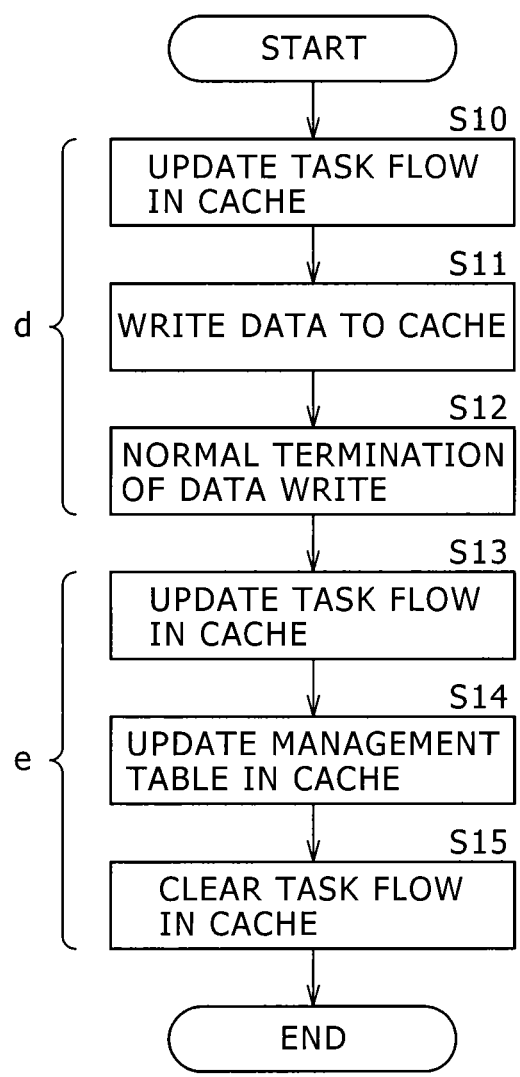
FIG. 5 is a flowchart illustrating another example of operation of the SSD device according to an aspect of the present technology.
Figure 6:
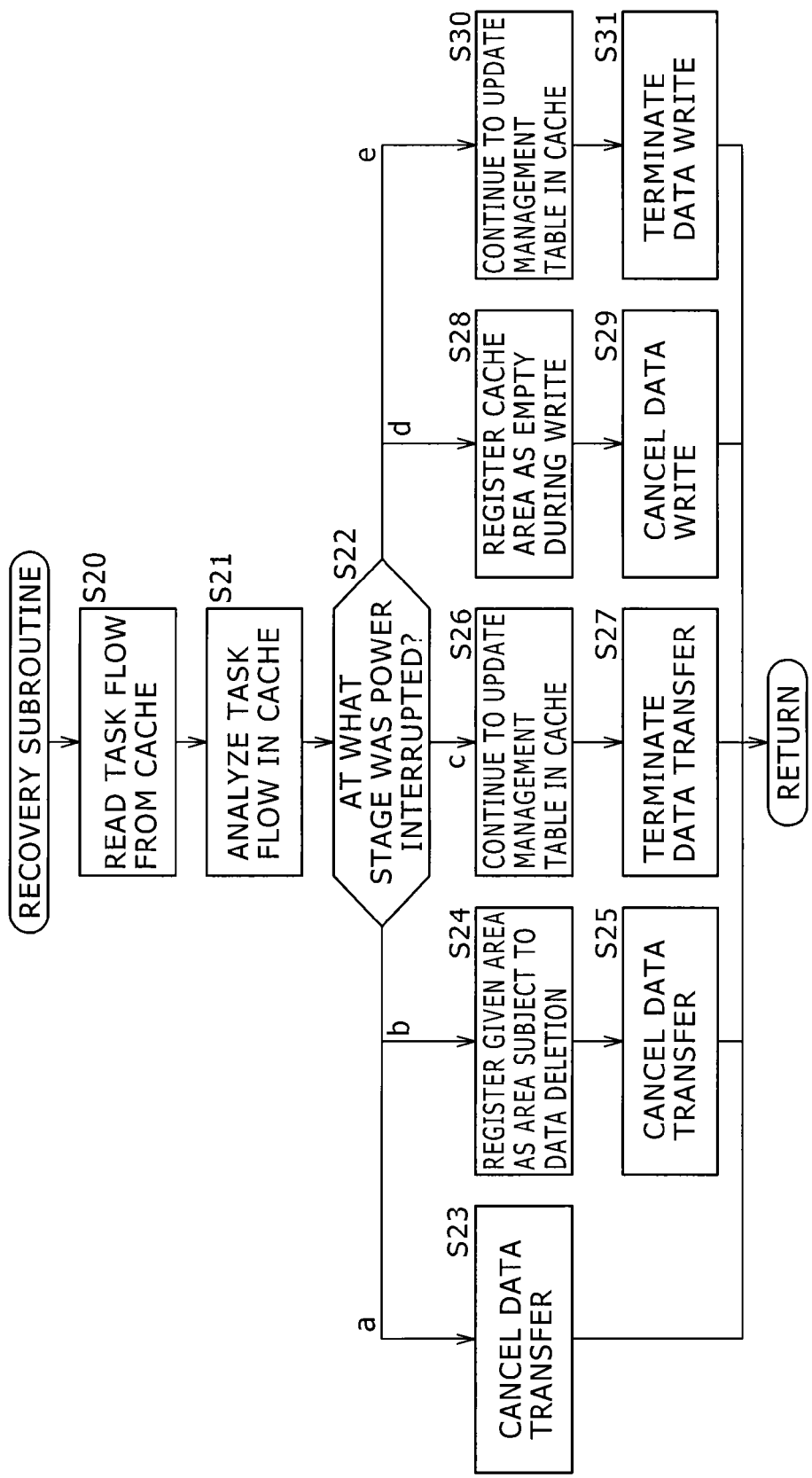
FIG. 6 is a flowchart illustrating yet another example of operation of the SSD device according to an aspect of the present technology.

A description will be given next of the operation of the SSD device 1 according to an aspect of the embodiment of the present technology with reference to FIGS. 4 to 6. It should be noted that the operations shown in FIGS. 4 to 6 are performed by the controller section 11 unless otherwise specified.

Figure 4:
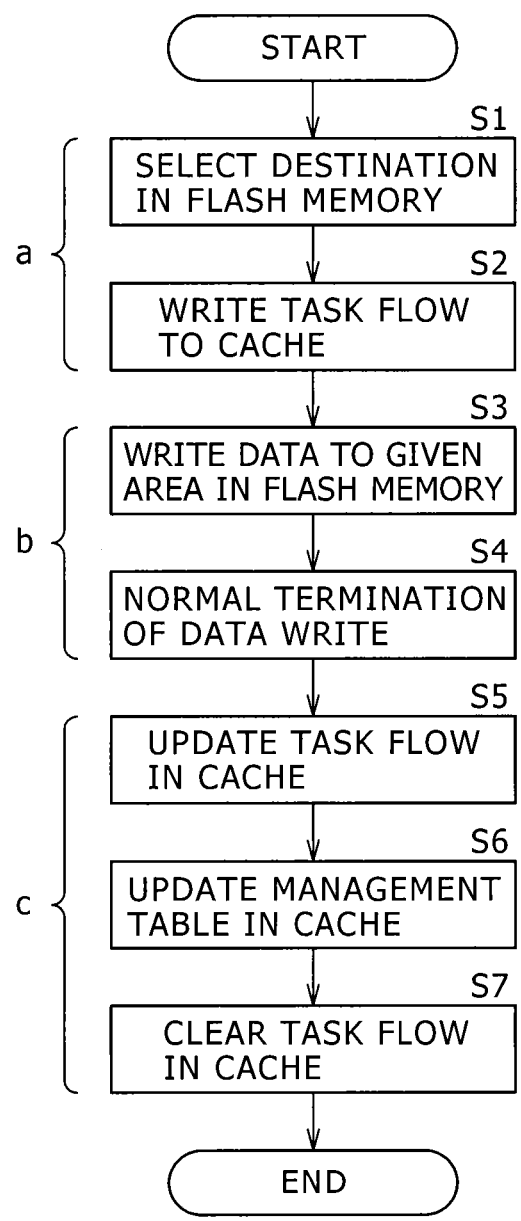
FIG. 4 is a flowchart illustrating an example of operation of the SSD device according to an aspect of the present technology.

First, FIG. 4 is a flowchart for describing the operation of the SSD device 1 when the data 33 (refer to FIG. 3) is written (transferred) from the cache memory section 13 of the SSD device 1 to the flash memory section 14. In FIG. 4, a given area (destination) of the flash memory section 14 to which the data is to be written is identified in step S1. Next, the task flow data 32 indicating the data transfer procedure from the cache memory section 13 to the flash memory section 14 is written to the cache memory section 13 in step S2.

In step S3, the data 33 written in the cache memory section 13 is written (transferred) to the given area of the flash memory section 14. In step S4, the flash memory section 14 notifies the controller section 11 that the data write has normally terminated.

In step S5, the task flow data 32 written in the cache memory section 13 is updated in response to the normal termination of the data write to the flash memory section 14 in step S4. The updating of the task flow data 32 in step S5 includes deletion of the processed task flow data 32 on a task-by-task basis and the rewriting of the task completion flag of the task flow data 32 (rewriting of the flag to indicate that the task in question has been performed). Next, in step S6, the management table 31 in the cache memory section 13 is updated similarly in response to the normal termination of the data write to the flash memory section 14 in step S4. Then, in step S7, the task flow data 32 written in the cache memory section 13 is deleted. The term "deleted" here includes not only the erasure of the task flow data 32 from the cache memory section 13 but also setting up the area in which the task flow data is written so that this area can be written to again.

Next, FIG. 5 is a flowchart for describing the operation of the SSD device 1 when data to be written to the flash memory section 14 of the SSD device 1 is received from the host equipment. First, in step S10, the task flow data 32 indicating the procedure for the cache memory section 13 to receive data is written to the cache memory section 13 in response to the receipt of data to be written to the flash memory section 14 from the host equipment as a trigger. In step S11, the data 33 received from the host equipment is written to the cache memory section 13. In step S12, the cache memory section 13 notifies the controller section 11 that the data write has normally terminated.

In step S13, the task flow data 32 written in the cache memory section 13 is updated in response to the normal termination of the data write to the cache memory section 13 in step S12. The updating of the task flow data 32 in step S13 includes deletion of the processed task flow data 32 on a task-by-task basis and the rewriting of the task completion flag of the task flow data 32 (rewriting of the flag to indicate that the task in question has been performed) as does the updating in step S5. Next, in step S14, the management table 31 in the cache memory section 13 is updated similarly in response to the normal termination of the data write to the cache memory section 13 in step S12. Then, in step S15, the task flow data 32 written in the cache memory section 13 is deleted. The term "delete" here includes not only the erasure of the task flow data 32 from the cache memory section 13 but also setting up the area in which the task flow data is written so that this area can be written to again.

FIG. 6 is a flowchart for describing the recovery of the SSD device 1 according to the present embodiment after a forceful power interruption in the middle of the operation shown in FIG. 4 or 5. First, in step S20, the task flow data 32 is read from the cache memory section 13. Next, in step S21, the task flow data 32 read in step S20 is analyzed.

Further, in step S22, it is determined at what stage of the operation shown in FIG. 4 or 5 power was interrupted. The determination as to at what stage power was interrupted can be made based on the state of updating of the task flow data 32 and the value of the task completion flag in the task flow data 32. Then, if it is determined that power was interrupted at the stage shown as "a" in FIG. 4, the program proceeds to step S23, and the data transfer from the cache memory section 13 to the flash memory section 14 is cancelled. Then, the SSD device 1 recovers to normal operation.

Further, if it is determined in step S22 that power was interrupted at the stage shown as "b" in FIG. 4, the program proceeds to step S24, and the given area identified in step S1 of FIG. 4 is registered in the management table 31 as an area subject to data deletion. Next, in step S25, the data transfer from the cache memory section 13 to the flash memory section 14 is cancelled. Then, the SSD device 1 recovers to normal operation. The term "registered as an area subject to data deletion" includes, for example, disabling the addresses for the given area of the management table 31 to permit data write thereto and specifying the block which includes the given area of the flash memory section 14 as a block subject to block-by-block deletion.

Still further, if it is determined in step S22 that power was interrupted at the stage shown as "c" in FIG. 4, the program proceeds to step S26, and the updating of the management table 31 shown in step S5 of FIG. 4 is continued. Next, in step S27, the data transfer from the cache memory section 13 to the flash memory section 14 terminates. Then, the SSD device 1 recovers to normal operation.

Still further, if it is determined in step S22 that power was interrupted at the stage shown as "d" in FIG. 5, the program proceeds to step S28, and the area of the cache memory section 13 in which the data received from the host equipment is written is registered as a vacant area. Next, in step S29, the data write to the cache memory section 13 is cancelled. Then, the SSD device 1 recovers to normal operation. The term "registered as a vacant area" here includes, for example, disabling the addresses of the area subject to data write to permit data write thereto.

Still further, if it is determined in step S22 that power was interrupted at the stage shown as "e" in FIG. 5, the program proceeds to step S30, and the updating of the management table 31 shown in step S13 of FIG. 5 is continued. Next, in step S31, the data write to the cache memory section 13 terminates. Then, the SSD device 1 recovers to normal operation.

As described above, the SSD device 1 according to an aspect of the embodiment of the present technology has the cache memory section 13 that includes a non-volatile memory different in type from a flash memory. The controller section 11 stores the data 33, management table 31 and task flow data 32, i.e., the pieces of data that have been instructed to be written from the host equipment to the SSD device 1, in the cache memory section 13. This prevents loss of the data 33, management table 31 and task flow data 32 even in the event of a forceful power interruption in the SSD device 1 and, moreover, permits recovery following the power interruption by referencing the task flow data 32. As a result, the SSD device 1 can properly deal with a power interruption. Further, unlike SSD devices in related art, the SSD device 1 can properly deal with a power interruption without any backup power supply provided for the cache memory, thus contributing to reduction in size and weight of the SSD device.

Here, considering the fact that the cache memory section 13 includes a non-volatile memory different in type from the flash memory section 14, a probable approach would be to store only the data 33 and management table 31 in the cache memory section 13 without storing the task flow data 32 therein. Even in this case, the contents of the data 33 and management table 31 at that point in time will probably not be lost even in the event of a power interruption. However, it is not possible to predict in advance at what stage of the data write from the host to the SSD device 1 a power interruption will occur. As a result, it may not be possible to properly handle recovery following a power interruption only with the contents of the data 33 and management table 31 depending on when the power interruption occurs. In order to deal properly with a power interruption, therefore, it is preferred to store not only the data 33 and management table 31 but also the task flow data 32 in the cache memory section 13.

It should be noted that the SSD device according to the present technology is not limited in detail to the above embodiment, but may be modified in a variety of ways. While FeRAM and MRAM are cited as examples of a non-volatile memory for use as the cache memory section 13 in the SSD device 1 according to an aspect of the above embodiment, a non-volatile memory that can be used as the cache memory section 13 is not limited thereto. Instead, a ReRAM (Resistance Random Access Memory) may be, for example, used. In short, any type of memory can be used so long as it can hold its data without being backed up by a power supply such as a battery.

What is claimed is:

1. A solid state drive (SSD) device using a flash memory, comprising:
   a non-volatile memory that differs in type from the flash memory; and
   controller configured to
   receive data to be written to the flash memory;
   store the received data in the non-volatile memory;
   store the data stored in the non-volatile memory to the flash memory; and
   store, in the non-volatile memory, flow data indicating a flow of tasks to be undertaken by the controller.

2. The SSD device of claim 1, wherein the controller is configured to:
   store, in the non-volatile memory, flow data indicating a flow of tasks to be undertaken by the controller while storing the received data in the non-volatile memory and storing the data stored in the non-volatile memory to the flash memory.

3. The SSD device of claim 1, wherein the controller is configured to:
   perform a recovery operation by referencing the flow data stored in the non-volatile memory when supply of power to the SSD device is forcefully interrupted.

4. The SSD device of claim 3, wherein the controller is configured to:
   perform a recovery operation for the SSD device by referencing the flow data stored in the non-volatile memory when the supply of power to the SSD device is forcefully interrupted during operation of the SSD device.

5. The SSD device of claim 3, wherein the controller is configured to:
   identify a destination of the flash memory to which the data stored in the non-volatile memory is to be stored; and
   store, as the flow data, task flow data indicating an initiation of a data transfer procedure of storing the data stored in the non-volatile memory to the identified destination of the flash memory.

6. The SSD device of claim 5, wherein the controller is configured to:
   cancel storing the data stored in the non-volatile memory to the flash memory when it is determined, based on the stored task flow data, that supply of power to the SSD device was forcefully interrupted when at least one of the identifying the destination and storing the task flow data were being performed.

7. The SSD device of claim 5, wherein the controller is configured to:
   receive confirmation data from the flash memory indicating that storing the data to the flash memory has been successfully completed.

8. The SSD device of claim 7, wherein the controller is configured to:
   register the identified destination as a destination subject to deletion and cancel storing the data to the identified destination when it is determined, based on the stored task flow data, that supply of power to the SSD device was forcefully interrupted when at least one of the storing the data stored in the non-volatile memory and receiving the confirmation were being performed.

9. The SSD device of claim 7, wherein the controller is configured to:
   update the task flow data stored in the non-volatile memory, update a management table stored in the non-volatile memory, and delete the task flow data stored in the non-volatile memory upon receiving the confirmation data from the flash memory indicating that storing the data stored in the non-volatile memory to the flash memory has been successfully completed.

10. The SSD device of claim 9, wherein the controller is configured to:
    continue updating the management table and complete storing the data to the flash memory, when it is determined, based on the stored task flow data, that supply of power to the SSD device was forcefully interrupted when at least one of the updating the task flow data, updating a management table, and deleting the task flow data were being performed.

11. The SSD device of claim 3, wherein the controller is configured to:
    store, as the flow data, task flow data indicating that a procedure for storing the received data in the non-volatile memory has been initiated; and
    receive, from the non-volatile memory, confirmation data indicating that the received data has been successfully stored in the non-volatile memory.

12. The SSD device of claim 11, wherein the controller is configured to:
    cancel storing the received data to the non-volatile memory when it is determined, based on the task flow data, that supply of power to the SSD device was forcefully interrupted when at least one of the storing the received data to the non-volatile memory, storing the task flow data and receiving the confirmation data was being performed.

13. The SSD device of claim 10, wherein the controller is configured to:
    update the task flow data stored in the non-volatile memory, update a management table stored in the non-volatile memory, and delete the task flow data stored in the non-volatile memory in response to receiving the confirmation data indicating that the received data has been successfully stored in the non-volatile memory.

14. The SSD device of claim 12, wherein the controller is configured to:
    continue updating the management table stored in the non-volatile memory and complete storing the receive data in the non-volatile memory, when it is determined, based on the stored flow data, that supply of power to the SSD device was forcefully interrupted when at least one of the updating the flow data stored in the non-volatile memory, updating the management table stored in the non-volatile memory, and deleting the task flow data stored in the non-volatile memory were being performed.

15. A method performed by a solid state drive (SSD) device using a flash memory and including a non-volatile memory that differs in type from the flash memory, the method comprising:
- receiving data to be written to the flash memory;
- storing the received data in the non-volatile memory;
- storing the data stored in the non-volatile memory to the flash memory; and
- storing, in the non-volatile memory, flow data indicating a flow of tasks to be undertaken while storing the received data in the non-volatile memory and storing the data stored in the non-volatile memory to the flash memory.

16. A non-transitory computer-readable medium including computer program instructions, which when executed by a solid state drive (SSD) device using a flash memory and including a non-volatile memory that differs in type from the flash memory, cause the SSD device to:
- receive data to be written to the flash memory;
- store the received data in the non-volatile memory;
- store the data stored in the non-volatile memory to the flash memory; and
- store, in the non-volatile memory, flow data indicating a flow of tasks to be undertaken while storing the received data in the non-volatile memory and storing the data stored in the non-volatile memory to the flash memory.

* * * * *